United States Patent [19]
Sylvester et al.

[11] Patent Number: 5,876,599
[45] Date of Patent: Mar. 2, 1999

[54] COMPACT IN-TANK FUEL FILTER AND MODULE

[75] Inventors: David M. Sylvester, Findlay; Robert A. Avers, Bowling Green, both of Ohio

[73] Assignee: Kuss Corporation, Findlay, Ohio

[21] Appl. No.: 835,243

[22] Filed: Apr. 7, 1997

[51] Int. Cl.⁶ .................................................. B01D 25/12
[52] U.S. Cl. .................. 210/232; 210/416.4; 210/493.2; 210/493.5
[58] Field of Search .................................. 210/172, 232, 210/416.4, 493.1, 493.2, 493.5, 460, 461

[56] References Cited

U.S. PATENT DOCUMENTS

| | | |
|---|---|---|
| 1,217,732 | 2/1917 | Fedders . |
| 1,601,503 | 9/1926 | Munro . |
| 3,389,801 | 6/1968 | Sieger ..................................... 210/135 |
| 4,312,753 | 1/1982 | Bell ......................................... 210/250 |
| 4,617,121 | 10/1986 | Yokoyama ............................ 210/416.4 |
| 4,684,463 | 8/1987 | Mizusawa ............................. 210/416.4 |
| 4,686,626 | 12/1969 | Close ...................................... 210/232 |
| 4,853,123 | 8/1989 | Hayes et al. ............................ 210/316 |
| 4,871,455 | 10/1989 | Terhune et al. ....................... 210/416.4 |
| 4,961,850 | 10/1990 | Combest ................................ 210/232 |
| 5,154,823 | 10/1992 | Ma et al. ................................ 210/232 |
| 5,169,531 | 12/1992 | Shiraga et al. ........................ 210/416.4 |
| 5,509,950 | 4/1996 | van de Graaf et al. .................. 55/486 |
| 5,582,729 | 12/1996 | Shioda et al. ......................... 210/416.4 |
| 5,665,229 | 9/1997 | Fitzpatrick et al. ..................... 210/232 |

FOREIGN PATENT DOCUMENTS 477600   10/1951   Canada .

Primary Examiner—Peter A. Hruskoci
Attorney, Agent, or Firm—Brinks Hofer Gilson & Lione

[57] ABSTRACT

The present invention relates to a compact in-tank fuel pump filter which forms a portion of a fuel pump and filter module for a vehicle. The fuel pump filter includes upper and lower filter housing members which cooperatively receive the filter element. Both housing members and the filter element are contoured to partially wrap around the fuel pump housing in order to maximize filter area and contaminate holding capacity while minimizing total filter size. The filter element is preferably pleated paper but may be any suitable high capacity filter media. The lower filter housing member includes an outlet fitting which mates with a complementarily configured inlet fitting and is secured by releasable snap-lock assemblies. The inlet fitting receives a fuel pump housing and includes passageways which direct fuel to the inlet of the fuel pump. The fuel pump draws fuel through the filter element, through the open interior of the filter element and provides the fuel withdrawn from the fuel tank to the vehicle engine.

24 Claims, 4 Drawing Sheets

COMPACT IN-TANK FUEL FILTER AND MODULE

BACKGROUND OF THE INVENTION

The invention relates generally to a compact fuel filter. More particularly, the present invention relates to a compact, in-tank fuel filter and module having a filter element coupled to the inlet of a juxtaposed in-tank fuel pump. The filter is kidney shaped and partially wraps around the fuel pump so as to provide large surface area, low flow resistance and high capacity filtration of fuel contaminates while exhibiting a small projected area or footprint.

There are available a variety of combination fuel filters and pumps which are useful for many purposes. U.S. Pat. No. 3,389,801 issued to Sieger discloses a filter and manual fuel pump assembly for inclusion in the fuel line of an automobile between the carburetor and the main fuel pump. The fuel pump assembly includes a circular filter cartridge canister and a manual fuel pump canister separated by an integral check valve structure. Fuel in the fuel pump canister is forced through the check valve and through various filtering media in the filter canister to supply the carburetor with pressure regulated fuel for starting and operating the vehicle engine. The separate canister design of the Sieger patent has at least two disadvantages: it increases the size of the fuel pump filter module and is not designed for use with a conventional in-tank fuel pump.

It is recognized that disposition of a fuel pump module within a fuel tank involves dimensional constraints in both the vertical and horizontal directions. U.S. Pat. No. 4,312,753 issued to Bell and U.S. Pat. No. 4,961,850 issued to Combest are representative of fuel pump filters for in-tank type fuel pumps. Typically, these types of filters utilize flexible woven plastic filtration media attached to the inlet of a conventional in-tank fuel pump and are disposed along the bottom surface of the fuel tank. These types of filters also have disadvantages: they require an internal frame to prevent collapsing of the filter walls during operation and also require elaborate means for attaching the filter to the inlet of the fuel pump. Furthermore, these types of filters are susceptible to damage during installation and removal of the fuel pump from the fuel tank.

The foregoing discussion suggests that existing fuel filter arrangements are prone to collapse, are subject to other mechanical failure or provide insufficient surface area. Accordingly, it is apparent that improvements in the configuration of in-tank fuel filters are desirable.

SUMMARY OF THE INVENTION

The present invention relates to a compact in-tank fuel filter which forms a portion of a fuel pump and filter module for a vehicle. The fuel filter includes upper and lower filter housing members which cooperatively receive the filter element. Both housing members and the filter element are contoured to partially wrap around the housing of the fuel pump in order to maximize the surface area of the filter element and contaminate holding capacity while minimizing pump and filter module area in the horizontal plane, i.e., the "footprint" of the module. The filter element is preferably pleated paper but may be any suitable high capacity filter media. An outlet fitting disposed on the lower housing member and an inlet fitting which receives the fuel pump housing include releasable snap-lock assemblies and complementarily configured components which couple and seal the outlet fitting to the inlet fitting. The fuel pump draws fuel through the filter element, through the open interior of the filter element, through the outlet and inlet fittings and into the fuel pump and provides the filtered fuel to the vehicle engine. In the preferred embodiment, the components such as the housing members and the outlet and inlet fittings are constructed of injection molded plastic, preferably nylon, polyester or acetal or any suitable rigid, fuel impervious material.

Thus it is an object of the present invention to provide a compact fuel filter for an in-tank fuel pump which can be conveniently mounted in a vehicle fuel tank.

It is a further object of the present invention to provide a compact fuel filter which ensures maximum vehicle engine component protection by providing high filtration efficiency of contaminates of the fuel.

It is a still further object of the present invention to provide an in-tank fuel pump and filter module that has a high surface area to footprint ratio.

It is a still further object of the present invention to provide a compact in-tank fuel filter having releasable fittings securing the filter assembly to the fuel pump.

It is a still further object of the present invention to provide a fuel filtration element which resists the tendency of the filtration media to collapse when subjected to the suction generated by a fuel pump.

Still further objects and advantages will become apparent by reference to the following description of the preferred embodiment and appended drawings wherein like reference numbers identify the same component, element or feature.

DESCRIPTION OF THE PREFERRED EMBODIMENT

Figure 1:
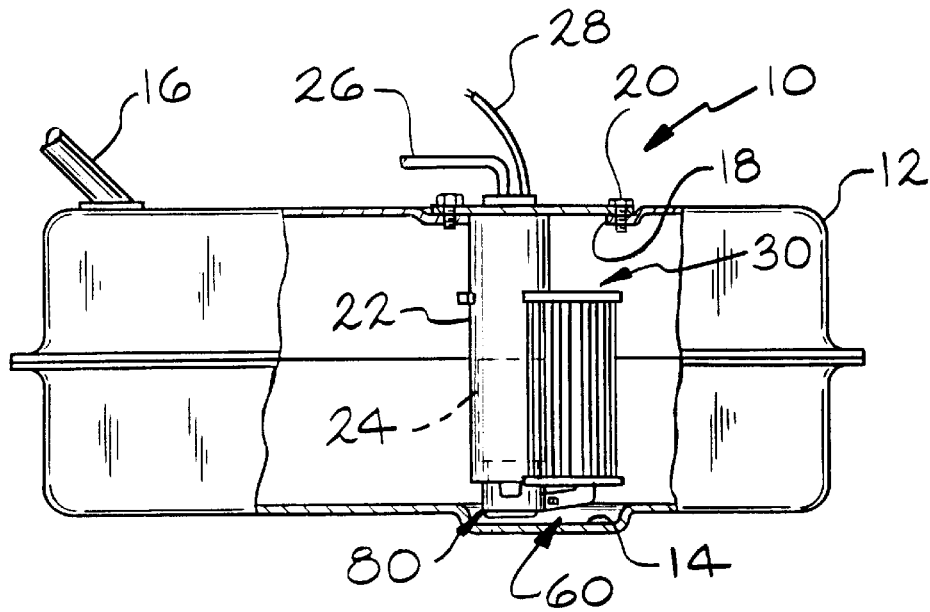
FIG. 1 is a diagrammatic, side elevational view of an automobile fuel tank having a compact in-tank fuel filter and pump module according to the present invention.

Referring now to FIG. 1, a compact in-tank fuel filter and pump module according to the present invention is illustrated and generally designated by the reference number 10. The fuel filter and pump module 10 is installed in a vehicle fuel tank 12 which may include a well 14 to facilitate maximum fuel removal from the tank 12 and does include a filler tube 16 for providing gas or other vehicle fuel to the fuel tank 12. The fuel filter and pump module 10 is mounted in an opening 18 in the top of the fuel tank 12 and may be sealingly secured therein by a suitable gasket (not illustrated) and fasteners 20 such as sheet metal screws or the like. The fuel filter and pump module 10 also includes a fuel pump housing 22 which contains and protects an electric fuel pump 24 which provides fuel under pressure in an outlet or supply line 26 and which is provided with electrical energy through a cable 28. The fuel filter and pump module 10 also includes a filter assembly 30 having a fuel outlet assembly 60 which is releasably connected to a fuel inlet assembly 80.

Figure 2:
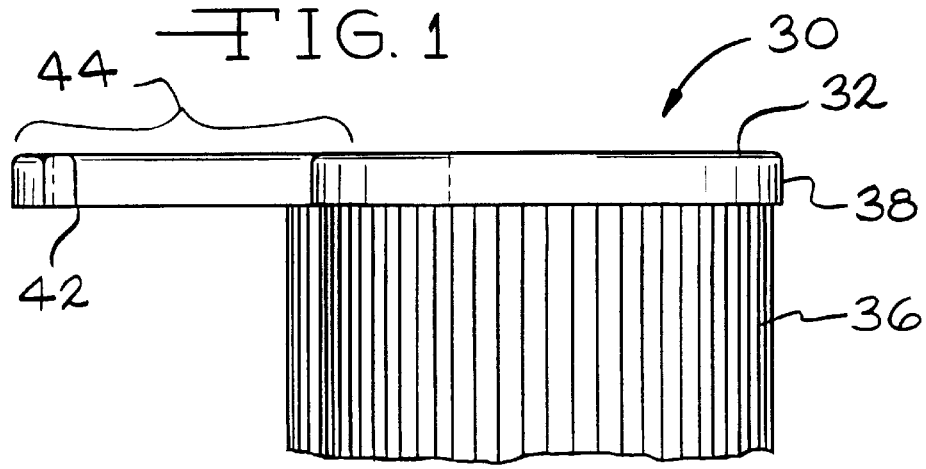
FIG. 2 is a side, elevational view of the in-tank fuel filter according to the present invention.
Figure 2:
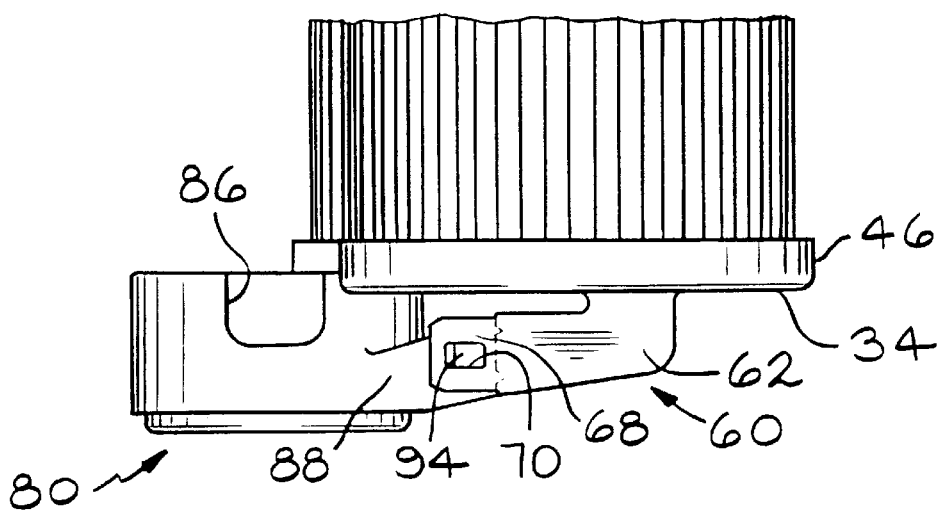
Figure 3:
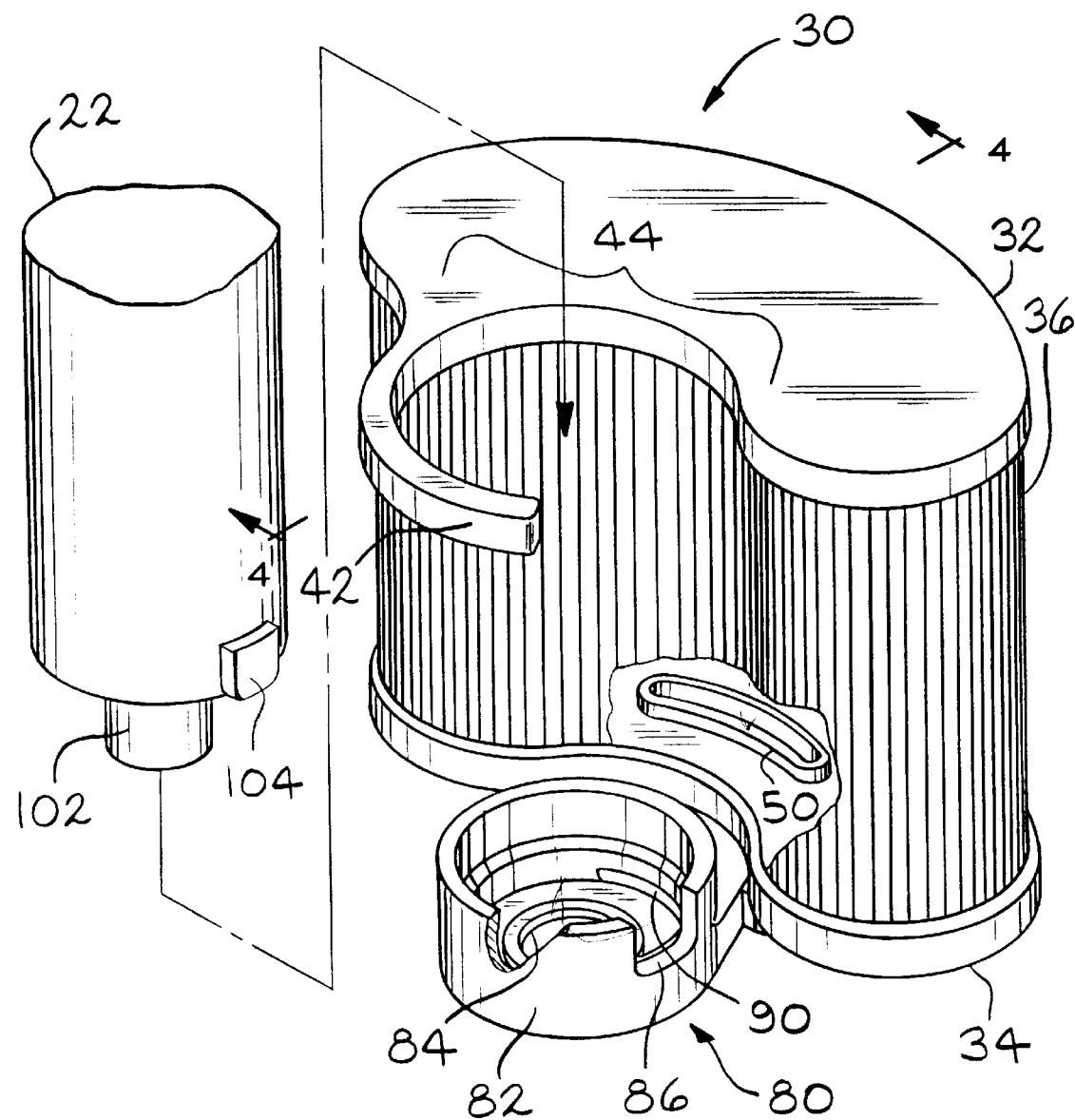
FIG. 3 is an exploded, perspective view, with portions broken away, of the in-tank fuel filter and fuel pump according to the present invention.
Figure 4:
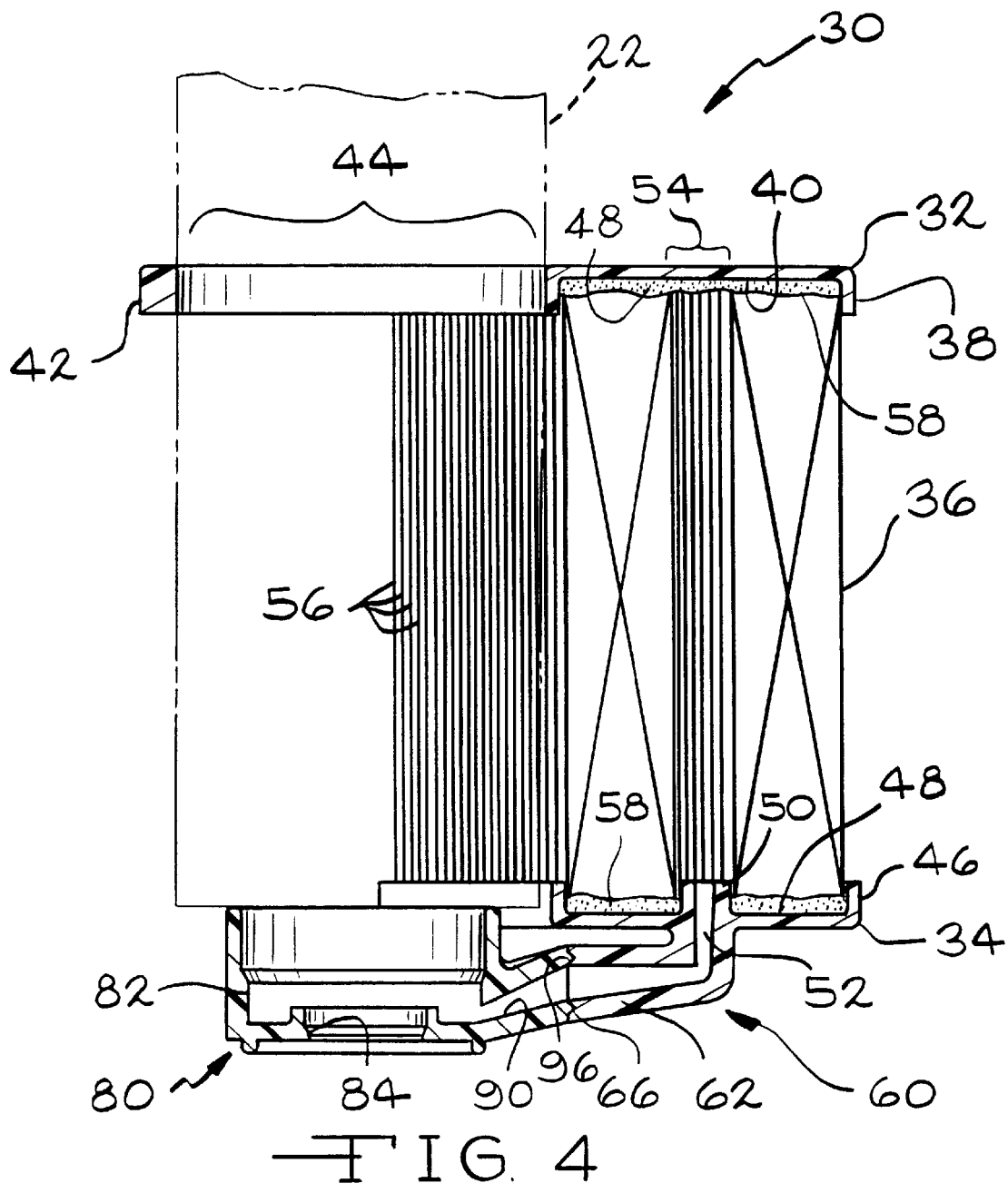
FIG. 4 is a full, sectional view of the in-tank fuel filter according to the present invention taken along the line 4—4 of FIG. 3.

Referring now to FIGS. 2 through 4, the filter assembly 30 includes an upper housing member 32 and a lower housing member 34, both generally reniform, i.e., kidney-shaped, which are disposed on opposite ends of a filter element 36.

The upper housing member 32 includes a depending peripheral skirt or lip 38, an interior surface 40 and a curved retaining arm 42 which is generally a curved extension of the peripheral lip 38. The retaining arm 42 defines a circular region 44, shown in FIG. 3, having a diameter approximately equal to the outside diameter of the fuel pump housing 22. The defined circular region 44 receives the fuel pump housing 22 and the retaining arm 42 engages the exterior of the fuel pump housing 22, thereby assisting retention and stabilization of the filter assembly 30 on the fuel pump housing 22 as will be readily appreciated.

The lower housing member 34 includes an upstanding peripheral skirt or lip 46, an interior surface 48 and a centrally disposed arcuate projection or lip 50 having a shape which mimics the reniform shape of the lower housing member 34 and defines a fuel outlet passageway 52 which will be discussed below.

Disposed between the upper housing member 32 and the lower housing member 34 and received within and adjacent the respective peripheral lips 38 and 46 is the filter element 36. The housing members 32 and 34 and the filter element 36 define a filtered fuel chamber 54 having a uniform horizontal cross section.

The filter element 36 is preferably formed of a high capacity pleated filter media such as paper or other suitably typically non-woven relatively rigid filtration media. The outer edge of the filter element 36 conforms to the inside edges of the peripheral lips 38 and 46. The depth of the filter pleats 56 is such that the filter media preferably extends the full radial distance from the inside edge of the peripheral lip 46 of the lower housing member 34 to the arcuate projection 50 on the interior surface 48 of the lower housing member 34. So configured, the peripheral lip 46 and the projection 48 ensure the proper positioning of the filter element 36 within the lower housing member 34 and thus facilitate proper positioning of the upper housing member 32 about the filter element 36. Furthermore, the area of the filtration surface is also maximized by ensuring that the depth of the filter pleats 56 is as described above.

The upper and lower ends of the filter element 36 are secured by a sealing material or adhesive 58 disposed on and covering the interior surface 40 of the upper housing member 32 and the interior surface 48 of the lower housing member 34. The adhesive 58 engages the entire length of the upper and lower edges of the pleats 56 of the filter element 36 to positively maintain their positions, inhibit fuel flow around end edges and prevent displacement of the filter element 36 relative to the housing members 32 and 34 under heavy fuel flow conditions or during installation of the filter assembly 30 into the fuel tank 12.

While efficient filter material, as used in this invention, is frequently low in mechanical strength, the present design allows the use of such material primarily because the asymmetrical cross-sectional area of the filter element 36 created by the reniform upper and lower housing members 32 and 34 provides increased resistance to bending of the filter assembly 30. Another benefit of the design of the filter assembly 30 is that total contaminate capacity and thus service life as well as flow capacity can be altered by simply adjusting the vertical dimension of the filter element 36. Such flow capacity adjustment and total contaminate capacity can occur without enlarging the overall footprint of the filter assembly 30.

Figure 5:
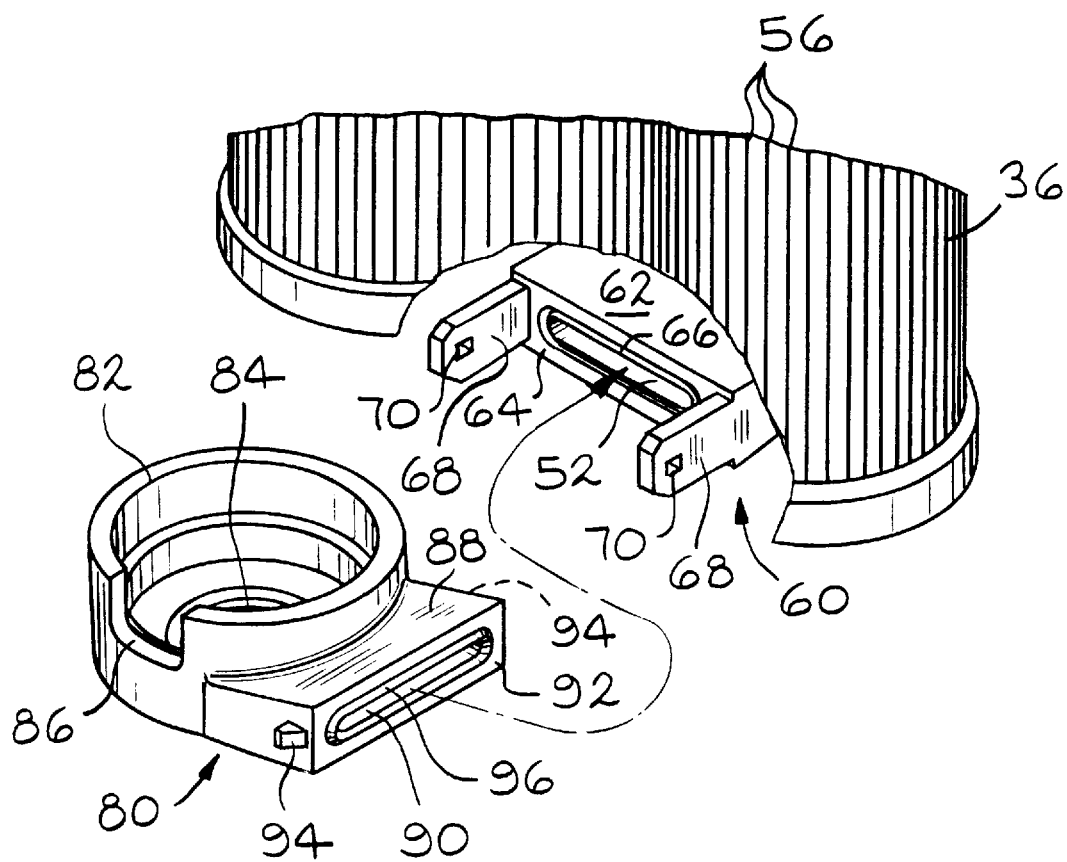
FIG. 5 is a fragmentary, exploded, perspective view, with portions broken away, of the in-tank fuel filter according to the present invention.

Referring now to FIGS. 3, 4 and 5, the fuel outlet assembly 60, generally located under the filter assembly 30, is preferably integrally formed with the lower housing member 34. The fuel outlet assembly 60 includes a fuel outlet member 62 which is rectangular in shape, having a relatively flat top, bottom and side surfaces, and which includes the through passageway 52 for fuel which extends from the projection 50 to a planar front surface 64 best shown in FIG. 5. Formed in the front surface 64 and extending completely around the mouth of the through passageway 52 is a narrow triangular groove or recess 66. The fuel outlet member 62 also includes a pair of parallel, spaced-apart arms 68 which extend perpendicularly from the planar front surface 64 of the fuel outlet member 62 as shown in FIG. 5 and form a portion of a pair of latches. Each of the pair of arms 68 defines a preferably square or rectangular aperture 70 adjacent its end.

The fuel inlet assembly 80 includes a fuel pump mounting fitting 82 which is generally cylindrical in shape. The fuel pump mounting fitting 82 is open at the top and defines a through pump alignment aperture 84 which extends through its bottom wall. Formed in the side wall of the fuel pump mounting fitting 82 is a registration notch 86 which circumferentially locates the fuel inlet assembly 80 and thus the entire filter assembly 30 relative to the fuel pump housing 22. Integrally formed with and extending generally radially from the fuel pump mounting fitting 82 is a fuel inlet member 88, best shown in FIG. 5. The fuel inlet member 88 is also rectangular in shape and similar to the fuel outlet member 62. The fuel inlet member 88 defines a through passageway 90 for fuel which extends from a rectangular planar surface 92 to the interior of the fuel pump mounting fitting 82. Each of a pair of locking projections or lugs 94 is located on opposite side surfaces of the fuel inlet member 88 as shown in FIG. 5 and forms a complementary portion of the pair of latches. Finally, the fuel inlet member 88 includes a narrow triangular rib or projection 96 which extends completely around the mouth of the through passageway 90 on the planar surface 92 and is complementary in size and cross-section to the triangular groove or recess 66 formed in the fuel outlet member 62.

The assembly of the components of the fuel pump and filter module 10, i.e., the in-tank fuel pump housing 22, the filter assembly 30, and the fuel inlet assembly 80 is as follows.

The fuel outlet assembly 60 is first connected to the fuel inlet assembly 80 as illustrated in FIGS. 2, 4 and 5. The fuel outlet member 62 is aligned with the fuel inlet member 88 so that the planar surface 64 is parallel to the planar surface 92. At this time, the two assemblies 60 and 80 are translated toward one another such that the pair of arms 68 slide over the corresponding locking lugs 94 until each aperture 70 engages and locks on the corresponding lug 94. At this time the planar surfaces 64 and 92 are in contact with one another and the triangular rib 96 is sealingly seated within the complementarily configured groove or recess 66 thereby providing a substantially fluid tight seal between the assemblies 60 and 80.

The in-tank fuel pump housing 22 which contains the fuel pump 24 is then assembled to the fuel inlet assembly 80. The fuel pump housing 22 is positioned in the circular region 44 defined by the retaining arm 42 and moved down into the fuel inlet assembly 80. A pump alignment stub 102 on the bottom of the fuel pump housing 22 engages the aperture 84 located in the bottom of the fuel inlet assembly 80 and the pump alignment lug 104 engages the registration notch 86 located on the outer wall of the fuel inlet fitting 82, best shown in FIG. 3.

The operation of the fuel pump filter module 10 is as follows. Upon actuation of the fuel pump 24, a suction is created which draws engine fuel contained in the fuel tank 12 through the filter element 36 and into the filtered fuel chamber 54. The fuel enters the fuel outlet passageway 52 of the fuel outlet assembly 60, and exits the fuel outlet passageway 52 through the fuel outlet enters the fuel inlet passageway 90 of the fuel inlet assembly 80. Leakage between the fuel outlet assembly 60 and the fuel inlet assembly 80 is prevented by the liquid-tight seal formed by the complementary recess 66 and the projection 96 as well as the planar surface 64 of the fuel outlet member 62 and the planar surface 92 of the fuel inlet member 88. The engine fuel is then drawn up through the fuel pump 24 and exits the fuel pump housing via the fuel supply line 26 which provides the vehicle engine with filtered fuel.

The foregoing disclosure is the best mode devised by the inventor for practicing this invention. It is apparent, however, that devices incorporating modifications and variations will be obvious to one skilled in the art of fuel pump devices. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An in-tank fuel filter assembly comprising, in combination,
    a fuel filter having a first housing member, a second housing member and a filtration element extending between said first and second housing members and defining an interior region,
    a curved arm extending from said first housing member, said curved arm defining an opening for receiving a fuel pump housing,
    an outlet fitting extending from said second housing member, said outlet fitting defining a passageway providing fluid communication with said interior region,
    an inlet fitting adapted to receive a fuel pump, said inlet fitting defining a passageway providing fluid communication with said passageway in said outlet fitting, and
    a coupling for securing said inlet fitting to said outlet fitting.

2. The in-tank fuel filter assembly of claim 1 wherein said filtration element is pleated filtration media.

3. The in-tank fuel filter assembly of claim 1 wherein said filtration element is pleated paper.

4. The in-tank fuel filter assembly of claim 1 wherein said outlet fitting and said inlet fitting include planar surfaces and one of said surfaces includes a circumferential projection around said passageway and the other of said surfaces includes a complementarily configured recess.

5. The in-tank fuel filter assembly of claim 1 wherein said filtration element is reniform in cross section.

6. The in-tank fuel filter assembly of claim 1 further including a fuel pump housing disposed in said inlet fitting.

7. The in-tank fuel filter assembly of claim 1 wherein said coupling includes a pair of tabs disposed on one of said fittings and a pair of complementarily configured projections disposed on the other of said fittings.

8. An in-tank fuel filter and pump module comprising, in combination,
    a fuel filter having a first housing member, a second housing member and a filter element extending between said first and second housing members and defining an interior region,
    an outlet fitting disposed on one of said housing members, said outlet fitting defining a passageway providing fluid communication with said interior region,
    an inlet fitting defining a passageway providing fluid communication with said passageway in said outlet fitting, and
    a fuel pump disposed in said inlet fitting in fluid communication with said inlet fitting passageway,
    wherein said filter element is reniform in cross section and wraps partially around said fuel pump.

9. The in-tank fuel filter and pump module of claim 8 wherein said filter element is pleated paper.

10. The in-tank fuel filter and pump module of claim 8 further including a coupling for securing said inlet fitting to said outlet fitting.

11. The in-tank fuel filter and pump module of claim 8 wherein said outlet fitting and said inlet fitting include planar surfaces and one of said surfaces includes a circumferential projection around said passageway and the other of said surfaces includes a complementarily configured recess.

12. An in-tank fuel filter comprising, in combination,
    a filter element defining a first end, an interior and a second end,
    a first housing member sealingly secured to said first end of said filter element,
    a second housing member sealingly secured to said second end of said filter element,
    a curved arm extending from said first housing member, said curved arm defining an opening for receiving a fuel pump housing,
    a first flow member extending from said second housing member and defining a first portion of an outlet passageway providing fluid communication between said interior of said filter and said fuel pump housing, and
    a second flow member defining a second portion of said outlet passageway.

13. The in-tank fuel filter of claim 12 wherein said filter element comprises pleated filter media.

14. The in-tank fuel filter of claim 13 wherein said curved arm encircles at least a portion of said fuel pump housing.

15. The in-tank fuel filter of claim 12 wherein said filter element comprises pleated paper.

16. The in-tank fuel filter of claim 12 wherein said curved arm defines an inner surface having a diameter approximately equal to the diameter of said fuel pump housing.

17. The in-tank fuel filter of claim 12 wherein said second flow member includes an aperture adapted to receive a portion of said fuel pump housing.

18. The in-tank fuel filter of claim 12 further including cooperating projections and recesses on said flow members for latching said members together.

19. The in-tank fuel filter of claim 12 further including latches for securing said second flow member and said first flow member.

20. An in-tank fuel filter comprising, in combination,
    a filter element defining a first end, an interior and a second end,
    an upper housing member sealingly secured to said first end of said filter element, a lower housing member sealingly secured to said second end of said filter element, a curved arm extending from said upper housing member, said curved arm defining an opening for receiving a fuel pump housing, and a fluid outlet member extending from said lower housing member and defining a circular region adapted to receive said fuel pump housing and a flow passageway providing fluid communication between said interior of said filter element and said circular region.

21. The in-tank fuel filter of claim 20 wherein said filter element comprises pleated filter media.

22. The in-tank fuel filter of claim 20 wherein said filter element comprises pleated paper.

23. The in-tank fuel filter of claim 20 wherein said curved arm encircles at least a portion of said fuel pump housing.

24. The in-tank fuel filter of claim 20 wherein said curved arm defines an inner surface having a diameter approximately equal to the diameter of said fuel pump housing.

* * * * *